(12) United States Patent
Kumazaki et al.

(10) Patent No.: US 9,071,036 B2
(45) Date of Patent: Jun. 30, 2015

(54) LASER APPARATUS

(71) Applicant: Gigaphoton Inc., Tochigi (JP)

(72) Inventors: Takahito Kumazaki, Tochigi (JP); Takashi Onose, Tochigi (JP); Osamu Wakabayashi, Tochigi (JP)

(73) Assignee: GIGAPHOTON, INC., Tochigi (JP)

( * ) Notice: Subject to any disclaimer, the term of this patent is extended or adjusted under 35 U.S.C. 154(b) by 5 days.

(21) Appl. No.: 13/895,524

(22) Filed: May 16, 2013

(65) Prior Publication Data

US 2013/0315270 A1    Nov. 28, 2013

(30) Foreign Application Priority Data

May 25, 2012 (JP) ................................. 2012-120015

(51) Int. Cl.
| | |
|---|---|
| H01S 3/10 | (2006.01) |
| H01S 3/081 | (2006.01) |
| H01S 3/106 | (2006.01) |
| H01S 3/137 | (2006.01) |
| H01S 3/1055 | (2006.01) |
| H01S 3/225 | (2006.01) |
| H01S 3/08 | (2006.01) |
| H01S 3/13 | (2006.01) |

(52) U.S. Cl.
CPC ........... *H01S 3/10069* (2013.01); *H01S 3/0812* (2013.01); *H01S 3/0811* (2013.01); *H01S 3/1055* (2013.01); *H01S 3/2251* (2013.01); *H01S 3/2256* (2013.01); *H01S 3/08004* (2013.01); *H01S 3/08009* (2013.01); *H01S 3/0805* (2013.01); *H01S 3/106* (2013.01); *H01S 3/137* (2013.01); *H01S 3/225* (2013.01); *H01S 3/1306* (2013.01)

(58) Field of Classification Search
CPC . H01S 3/0812; H01S 3/0811; H01S 3/08009; H01S 3/1055; H01S 3/225; H01S 3/2251; H01S 3/2256
USPC ................... 372/20, 57, 55, 102, 100, 99, 98
See application file for complete search history.

(56) References Cited

U.S. PATENT DOCUMENTS

| | | | |
|---|---|---|---|
| 7,088,758 B2 | 8/2006 | Sandstrom et al. | |
| 7,154,928 B2 | 12/2006 | Sandstrom et al. | |
| 2002/0027936 A1* | 3/2002 | Govorkov et al. | 372/57 |
| 2002/0101900 A1* | 8/2002 | Govorkov et al. | 372/57 |
| 2008/0285602 A1* | 11/2008 | Nagai et al. | 372/20 |

* cited by examiner

*Primary Examiner* — Kinam Park
(74) *Attorney, Agent, or Firm* — Kratz, Quintos & Hanson, LLP (57) ABSTRACT

A laser apparatus may include an optical resonator, a laser chamber, an optical loss adjustment mechanism, and a spectral line width adjustment mechanism. The optical resonator includes a mirror configured to reflect a part of light and a grating. The laser chamber is provided in the optical resonator and contains a laser gain medium, configured to emit a laser beam. The optical loss adjustment mechanism is provided in the optical resonator and configured to adjust an optical loss of the laser beam. The spectral line width adjustment mechanism is provided in the optical resonator and configured to adjust a spectral line width of the laser beam.

1 Claim, 12 Drawing Sheets

LASER APPARATUS

CROSS REFERENCE TO RELATED APPLICATIONS

This patent application is based upon and claims the benefit of priority of Japanese Patent Application No. 2012-120015, filed on May 25, 2012, the entire contents of which are incorporated herein by reference.

BACKGROUND

1. Technical Field

The disclosure relates to a laser apparatus.

2. Related Art

The miniaturization and increased levels of integration of semiconductor integrated circuits has led to a demand for increases in the resolution of semiconductor exposure devices (called "exposure devices" hereinafter). Accordingly, advances are being made in the reduction of the wavelengths of light emitted from exposure light sources. Gas laser devices are being used as exposure light sources instead of conventional mercury lamps. At present, a KrF excimer laser device that emits ultraviolet light at a wavelength of 248 nm and an ArF excimer laser device that emits ultraviolet light at a wavelength of 193 nm are being used as gas laser devices for exposure.

Immersion exposure, in which the apparent wavelength of an exposure light source is reduced by filling the space between the exposure lens of an exposure device and a wafer with a liquid and changing the refractive index, is being researched as a next-generation exposure technique. In the case where immersion exposure is carried out using an ArF excimer laser device as the exposure light source, the wafer is irradiated with ultraviolet light at a wavelength of 134 nm within the liquid. This technique is referred to as ArF immersion exposure (or ArF immersion lithography).

The natural oscillation amplitude of a KrF or ArF excimer laser device is as wide as 350-400 pm, and thus chromatic aberration will occur if the projection lens in the device is used, leading to a drop in the resolution. It is therefore necessary to narrow the spectral bandwidth (spectral width) of the laser beam emitted from the gas laser device until the chromatic aberration reaches a level that can be ignored. Accordingly, the spectral width has been narrowed by providing a line narrow module (LNM) having a line narrowing element (an etalon, a grating, or the like) within the laser resonator of the gas laser device. A laser device that narrows the spectral width in this manner is called a narrow-band laser device.

SUMMARY

A laser apparatus according to one aspect of the present disclosure may include an optical resonator, a laser chamber, an optical loss adjustment mechanism, and a spectral line width adjustment mechanism. The optical resonator includes a mirror configured to reflect a part of light and a grating. The laser chamber is provided in the optical resonator and configured to contain a laser gain medium and to emit a laser beam. The optical loss adjustment mechanism is provided in the optical resonator and configured to adjust an optical loss of the laser beam. The spectral line width adjustment mechanism is provided in the optical resonator and configured to adjust a spectral line width of the laser beam.

BRIEF DESCRIPTION OF THE DRAWINGS

Hereinafter, selected embodiments of the present disclosure will be described hereinafter merely as examples with reference to the accompanying drawings.

DETAILED DESCRIPTION

Hereinafter, selected embodiments of the present disclosure will be described in detail with reference to the accompanying drawings. The embodiments to be described below are merely illustrative in nature and do not limit the scope of the present disclosure. Further, the configurations and operations described in each embodiment are not all essential in implementing the present disclosure. Note that like elements are referenced by like reference numerals and characters, and duplicate descriptions thereof will be omitted herein.

Contents

1. Terms
2. Spectral Line Width Variable Laser Apparatus for Lithography Apparatus
2.1 Configuration
2.2 Operation
2.3 Effect
2.4 Flowchart
3. Optical Resonator of Spectral Line Width Variable Laser Apparatus
4. Embodiments of Optical Loss Adjustment Mechanism
4.1 Optical Path Length Adjustment Mechanism
4.2 Transmittance Adjustment Mechanism
4.3 Slit Width Adjustment Mechanism
5. Wave Surface Adjustment Mechanism
6. Spectral Line Width Adjustment Mechanism
7. Combination of Spectral Line Width Adjustment Mechanism and Optical Loss Adjustment Mechanism
7.1 Combination with Optical Path Length Adjustment Mechanism
7.2 Combination with Transmittance Adjustment Mechanism
8. Spectrum Variable Laser Apparatus Including Amplifier

1. Terms

At first, terms used in the present disclosure are defined as follows. In recent years, when an ordinary circuit pattern and a circuit pattern of a deep through hole are exposed, the exposure may be sometimes performed by switching a laser beam with a narrow spectral width (e.g., about 0.3 pm) and a laser beam with a broad spectral width (e.g., about 1.5 pm). In the present disclosure, outputting a laser beam with such abroad spectral line width to expose the circuit pattern of the deep through hole is defined as a focus drilling (FD) mode. Outputting a laser beam with a narrow spectral line width is defined as a normal mode.

2. Spectral Line Width Variable Laser Apparatus for Lithography Apparatus

In the meanwhile, some of semiconductor devices produced by using an ArF excimer laser apparatus as a lithography light source includes a multi-layer interconnection. In such a semiconductor device in which the multi-layer interconnection is formed, using the laser beam with a narrow spectral width is preferable in forming a normal interconnection pattern, and using the laser beam with abroad spectral width is preferable in forming a via hole and the like. Accordingly, controlling the spectral width is important in the ArF excimer laser apparatus.

However, because widely changing the spectral line width causes output energy of the laser beam to change greatly, excitation intensity has to be adjusted to set pulse energy of the laser beam at a predetermined value appropriate for the lithography. Moreover, when using a discharge excitation excimer laser, in a case of decreasing excessive output energy of a laser beam, if a charging voltage is lowered to decrease excitation intensity, the discharge becomes unstable and stability of the pulse energy becomes worse.

2.1 Configuration

Figure 1:
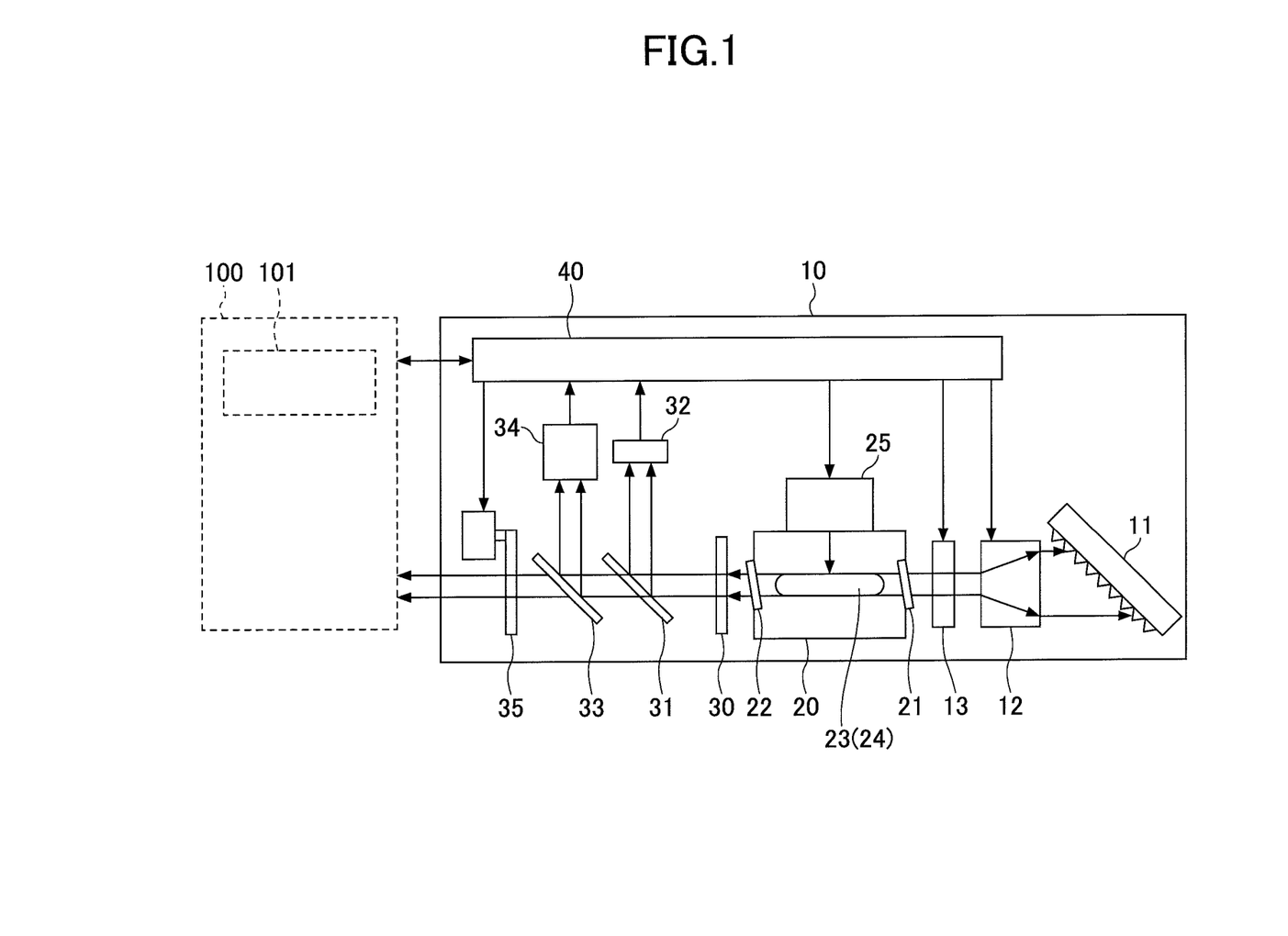
FIG. 1 is a structural drawing of a laser apparatus of the present disclosure.

FIG. 1 shows a laser apparatus 10 that can change a spectral line width for a lithography apparatus (which may be hereinafter called a spectral line width variable laser apparatus) of an embodiment of the present disclosure. This spectral line width variable laser apparatus 10 may include a grating 11 to generally limit a spectrum, a spectral line width adjustment mechanism 12 to adjust a spectral line width, and an optical loss adjustment mechanism 13 to keep laser intensity within a resonator approximately constant. The optical loss adjustment mechanism 13 may adjust light intensity of a laser beam by adjusting an optical loss in the laser resonator and may be able to keep the laser intensity within the resonator approximately constant.

Furthermore, the spectral line width variable laser apparatus 10 includes a laser chamber 20 in which an excimer gas being a laser medium is encapsulated to perform discharge excitation, and may include windows 21 and 22 to allow light to enter or exit from the laser chamber 20. The laser medium may be, for example, either a Kr gas or an Ar gas, or a mixed gas further including $F_2$ gas and/or Ne gas. In addition, electrodes 23 and 24 are provided in the laser chamber 20, and a high voltage may be applied to the excimer gas from a power source 25 through the electrodes 23 and 24. Moreover, an output coupler 30 may be provided on the output side of the laser beam, and the output coupler 30 and the grating 11 may form a resonator.

The spectral line width variable laser apparatus 10 may include a first beam splitter 31, an energy detector 32, a second beam splitter 33, a spectral line width detector 34, and a shutter 35. The first beam splitter 31 may be to separate off a part of the output light to detect energy of the laser beam, and the energy detector 32 may be to detect energy of the laser beam. The second beam splitter 33 may be to separate off a part of the output light in order to detect and control the spectral line width of the laser beam. The spectral line width detector 34 may be to detect a spectral width of the laser beam. The shutter 35 may prevent an unnecessary laser beam from entering the lithography apparatus 100 during "adjustment oscillation" to perform an adjustment so as to obtain a laser beam with a desired property for the lithography apparatus 100.

Furthermore, the spectral line width variable laser apparatus 10 includes a control unit 40, which may control opening and closing of the shutter 35, a voltage applied between the electrodes 23 and 24 from the power source 25, the spectral line width adjustment mechanism 12, and the optical loss adjustment mechanism 13. The control of these by the control unit 40 may be performed based on a signal that a controller 101 transmits and/or receives provided in the lithography apparatus 100 or a signal of the spectral line width or the energy that the spectral line width variable apparatus 10 detects by itself.

2.2 Operation

Next, a description is given below about operation of the spectral line width variable laser apparatus 10, based on the control operation of the control unit 40.

The control unit 40 may transmit a closing signal to the shutter 35 upon receiving a target spectral line width from the controller 101 in the lithography apparatus 100. Here, if the shutter 35 has been closed, the control unit 40 may transmit an opening signal to open the shutter 35 for control at the stage of having obtained a desired property, as described below.

The control unit 40 may transmit a signal to control the spectral line width adjustment apparatus 12 based on stored data so that the spectral line width of the output laser beam becomes the target spectral line width. The control unit 40 may control the spectral line width adjustment mechanism 12 so that the laser beam is output at a spectral line width close to the target spectral line width according to the spectral line width detected by the spectral line width detector 34 during the adjustment oscillation.

In addition, the control unit 40 may transmit a signal to control the optical loss adjustment mechanism 13 based on the stored data so that the excitation intensity (which depends on the voltage applied from the power source 25) is in a predetermined range and the output energy of the output laser beam becomes a target energy value. Here, the "predetermined range in which voltage applied from the power source 25" means a range of a voltage value that causes less stability deterioration of the pulse energy caused by instability of discharge. The control unit 40 may control the optical loss adjustment mechanism 13 so that the laser beam is output at an energy value close to the target energy value according to the detected energy value by the energy detector 32 in the adjustment oscillation.

When the output laser beam having the desired property is ensured, the control unit 40 may transmit a signal indicating "lithography preparation finished" to the controller 101 of the lithography apparatus 100. Though not described explicitly, a similar control may be performed with respect to a wavelength of the laser beam.

2.3 Effect

The spectral line width variable laser apparatus 10 may control the optical loss adjustment mechanism 13 and the spectral line width adjustment mechanism 12 upon receiving a signal related to the target spectral line width from the controller 101 of the lithography apparatus 100 so that the laser beam has the target spectral line width and the target energy. According to the above, the optical loss adjustment mechanism 13 is adjusted without adjusting the excitation intensity to set the pulse energy at a predetermined value when the spectral line width is widely changed. Accordingly, since a variation range of a drive voltage is suppressed in a range of having preferable stability of the pulse energy, the output of the spectral line width variable laser apparatus 10 may be stable even if the spectral line width is varied greatly.

2.4 Flowchart

Figure 2:
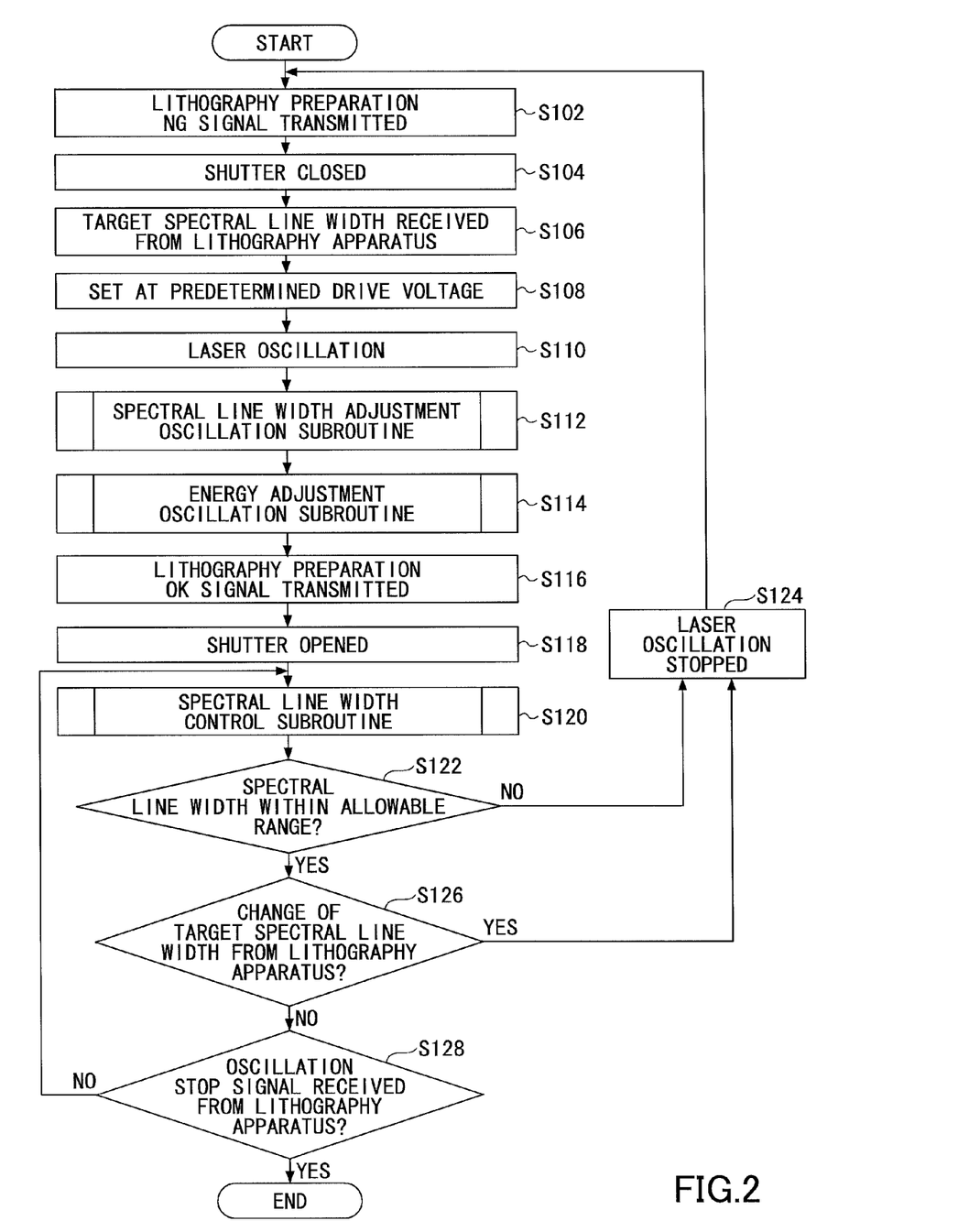
FIG. 2 is a first flowchart to illustrate operation of a laser apparatus of the present disclosure.

Next, a description is given below about operation of the spectral line width variable apparatus of the present disclosure, based on FIG. 2 as an example.

First, in step S102, the control unit 40 may transmit a lithography preparation NG signal to the shutter 35.

Next, in step S104, the shutter 35 may be closed.

Next, in step S106, the control unit 40 may receive a signal with respect to a target spectral line width from the controller 101 of the lithography apparatus 100.

Next, in step S108, the control unit 40 may set a voltage applied to the electrodes 23 and 24 from the power source 25 at a predetermined voltage. Here, the predetermined voltage may be, for example, a voltage in a range that causes less stability deterioration of pulse energy caused by instability of discharge.

Next, in step S110, the predetermined voltage may be applied to the electrodes 23 and 24 from the power source 25, and laser oscillation may be caused by discharge excitation of the excimer gas in the laser chamber 20.

In step S112, a spectral line width adjustment oscillation subroutine may be performed to adjust the spectral line width. A detailed description about the spectral line width adjustment oscillation subroutine is given in FIG. 3 described below.

In step S114, an energy adjustment oscillation subroutine may be performed to adjust the energy. A detailed description about the energy oscillation subroutine is given in FIG. 4 described below.

In step S116, the control unit 40 may transmit a lithography preparation OK signal to the shutter 35.

In step S118, the shutter 35 may be opened.

In step S120, a spectral line width control subroutine may be performed to control the spectral line width. A detailed description about the spectral line width control subroutine is given in FIG. 5 described below.

In step S122, the control unit 40 and the like may determine whether the spectral line width detected by the spectral line width detector 34 is within an allowable range. When the spectral line width detected by the spectral line width detector 34 is within the allowable range, the process may advance to step S126. On the other hand, when the spectral line width detected by the spectral line width detector 34 is not within the allowable range, the process may shift to step S124.

In step S124, the laser oscillation may be stopped. More specifically, the laser oscillation may be stopped by stopping applying the voltage to the electrodes 23 and 24 from the power source 25 by the control of the control unit 40 and the like. Subsequently, the process may return to step S102.

In step S126, it may be determined if there is a change of the target spectral line width from the controller 101 of the lithography apparatus 100 to the control unit 40 and the like. When the control unit 40 and the like have received the changed target spectral line width from the lithography apparatus 100, the process may return to step S124. In contrast, when the control unit 40 and the like have not received the changed target spectral line width from the lithography apparatus 100, the process may advance to step S128.

In step S128, it may be determined if the control unit 40 and the like have received an oscillation stop signal from the lithography apparatus 100. When the control unit 40 and the like have received the oscillation stop signal from the lithography apparatus 100, the flowchart may be finished. On the other hand, when the control unit 40 and the like have not received the oscillation stop signal from the lithography apparatus 100, the process may return to step S120.

Figure 3:
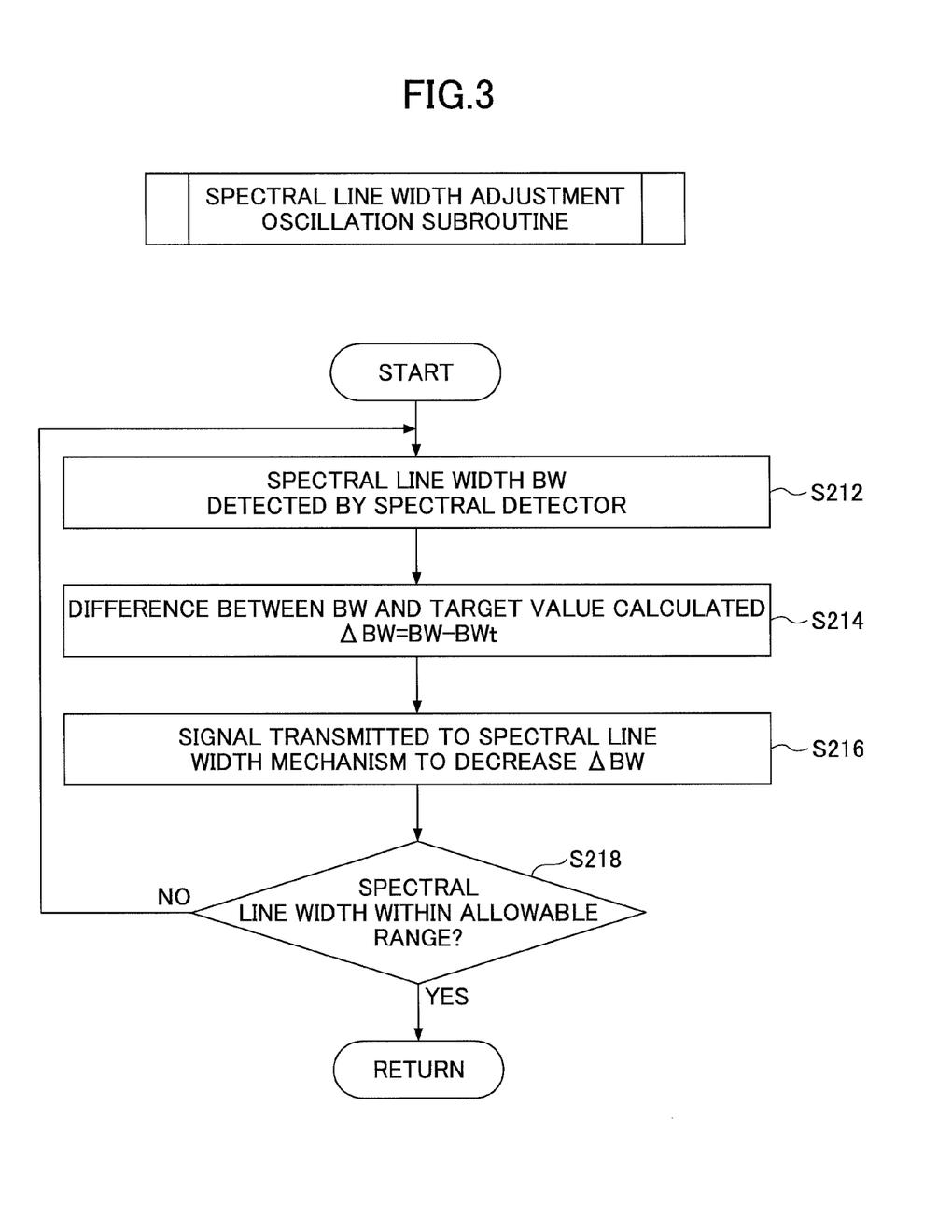
FIG. 3 is a second flowchart to illustrate operation of a laser apparatus of the present disclosure.

Next, a description is given below about the spectral line width adjustment oscillation subroutine based on FIG. 3 as an example.

First, in step S212, the spectral line width detector 34 may detect a spectral line width BW of the laser beam.

Next, in step S214, the control unit 40 and the like may calculate a difference $\Delta BW$ between the spectral line width BW detected by the spectral line width detector 34 and a target value BWt of the spectral line width.

In step S216, the spectral line width adjustment mechanism 12 may be adjusted so as to decrease the difference $\Delta BW$ by the control of the control unit 40. More specifically, the control unit 40 may transmit a signal to decrease the difference $\Delta BW$ to the spectral line width adjustment mechanism 12, by which the spectral line width adjustment mechanism may be adjusted. Specific contents about the adjustment are described below.

In step S218, it may be determined whether the spectral line width detected by the spectral line width detector 34 is within an allowable range, after the adjustment by the spectral line width adjustment mechanism 12 is performed by the control unit 40 and the like. The determination may be about whether the value of the difference $\Delta EW$ is within a predetermined range. When the spectral line width after the adjustment by the spectral line width adjustment mechanism 12 is within the allowable range, the spectral line width adjustment oscillation subroutine may be finished, and the process may return to the main routine as shifting to step S114 of the flowchart shown in FIG. 2.

According to the above, the spectral line width of the laser beam can be set to a value within the allowable range.

Figure 4:
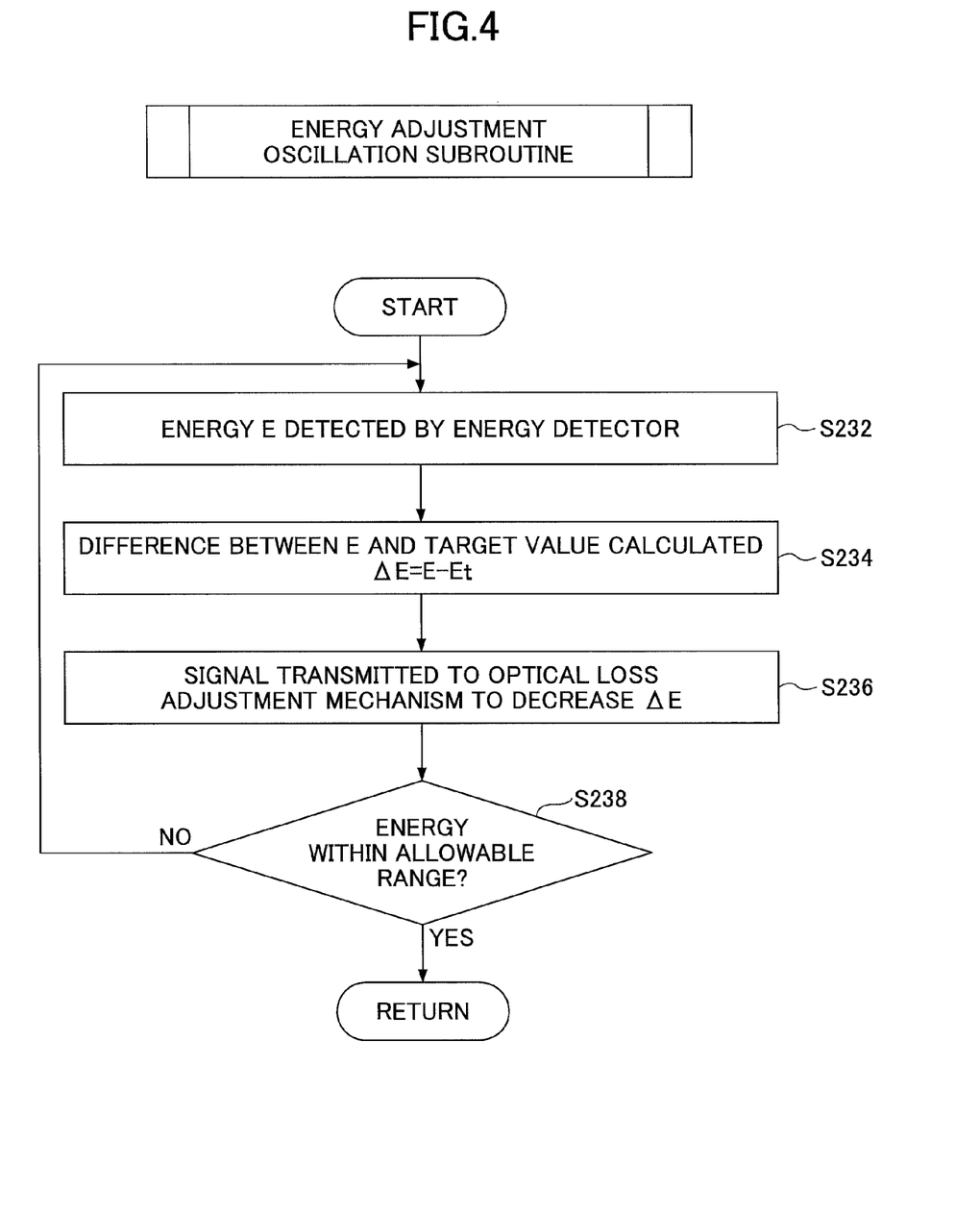
FIG. 4 is a third flowchart to illustrate operation of a laser apparatus of the present disclosure.

Next, a description is given about the energy adjustment oscillation subroutine based on FIG. 4 as an example.

First, in step S232, the energy detector 32 may detect an energy E of the laser beam.

Next, in step S234, a difference $\Delta E$ between the energy detected by the energy detector 32 and an energy target value Et may be calculated by the control unit 40 and the like.

In step S236, an adjustment of the optical loss adjustment mechanism 13 may be performed so as to decrease the value of the difference ΔE by the control of the control unit 40. More specifically, the control unit 40 may transmit a signal to decrease the difference ΔE to the optical loss adjustment mechanism 13, by which the adjustment of the optical loss adjustment mechanism 13 may be performed.

In step S238, it may be determined whether the energy detected by the energy detector 32 is within an allowable range, after the adjustment by the optical loss adjustment mechanism 13 is performed by the controller unit 40 and the like. The determination may be about whether the value of the difference Δ E is within an allowable range. When the energy after the adjustment by the optical loss adjustment mechanism 13 is within the allowable range, the energy adjustment oscillation subroutine may be finished, and the process may return to the main routine as shifting to step S116 of the flowchart shown in FIG. 2. On the other hand, when the energy after the adjustment by the optical loss adjustment mechanism 13 is not within the allowable range, the process may return to step S232.

According to the above, the energy of the laser beam can be set to a value within the allowable range.

Figure 5:
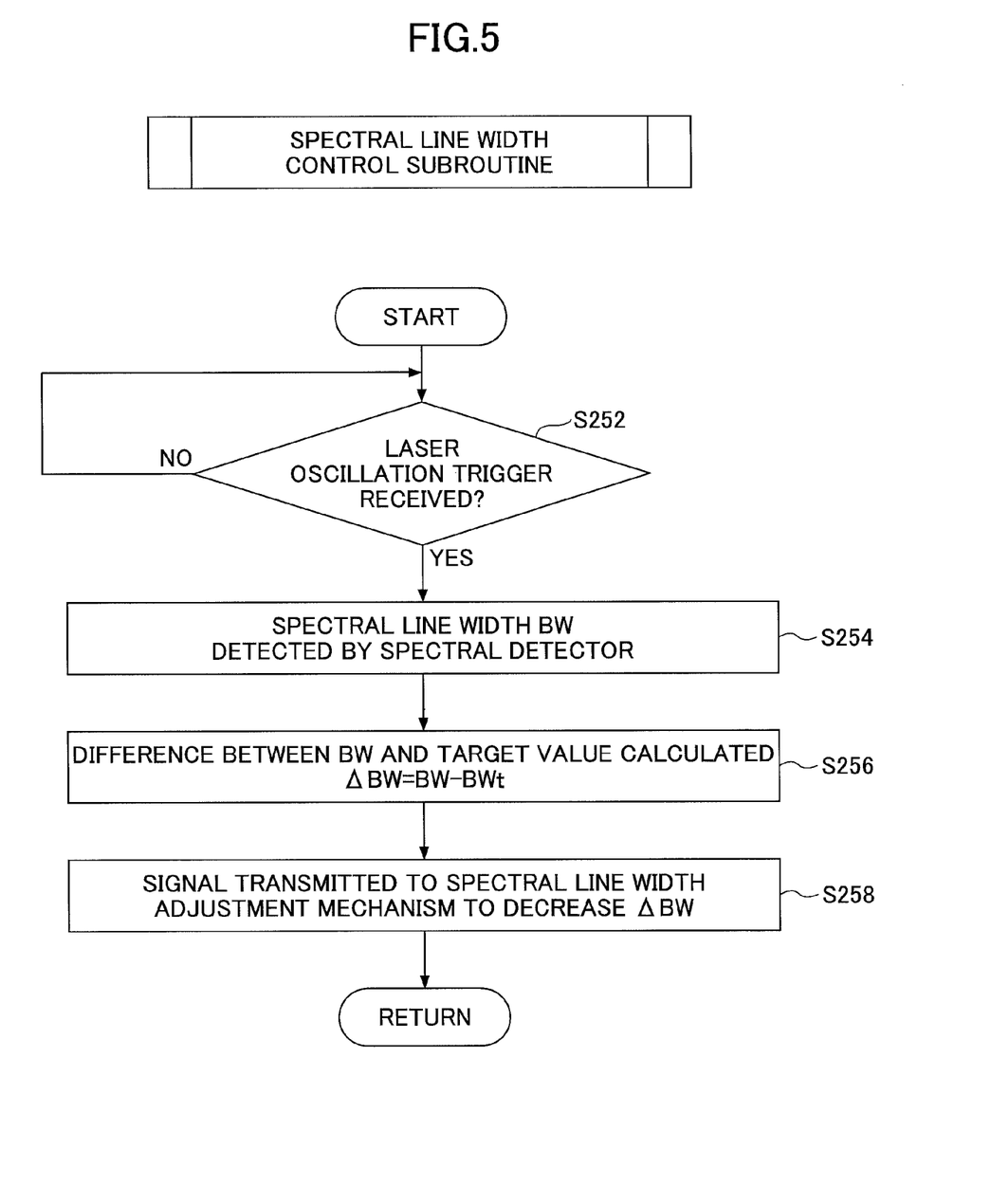
FIG. 5 is a fourth flowchart to illustrate operation of a laser apparatus of the present disclosure.

Next, a description is given about the spectral line width control subroutine based on FIG. 5.

First, in step S252, it may be determined whether the control unit 40 and the like have received a laser oscillation trigger signal from the controller 101 of the lithography apparatus 100. When the control unit 40 and the like have received the laser oscillation trigger signal from the lithography apparatus 100, the process may advance to step S254. On the other hand, when the control unit 40 and the like have not received the laser oscillation trigger signal from the controller 101 of the lithography apparatus 100, the process may return to the first of step S252 again.

Next, in step S254, the spectral line width detector 34 may detect a spectral line width BW of the laser beam.

In step S256, a difference ΔBW between the spectral line width BW detected by the spectral line width detector 34 and a spectral line width target value BWt may be calculated by the control unit 40 and the like.

In step S258, the spectral line width adjustment mechanism 12 may be adjusted so as to decrease the difference BW by the control of the control unit 40. More specifically, the control unit 40 may transmit a signal to decrease the difference ΔBW to the spectral line width adjustment mechanism 12, by which the spectral line width adjustment mechanism may be adjusted. Specific contents of the adjustment are described below. Subsequently, the spectral line width control subroutine may be finished, and the process may return to the main routine, shifting to step S122 of the flowchart shown in FIG. 2.

According to the above, the spectral line width of the laser beam can be set to a value within the allowable range.

3. Optical Resonator of Spectral Line Width Variable Laser Apparatus

Figure 6A:
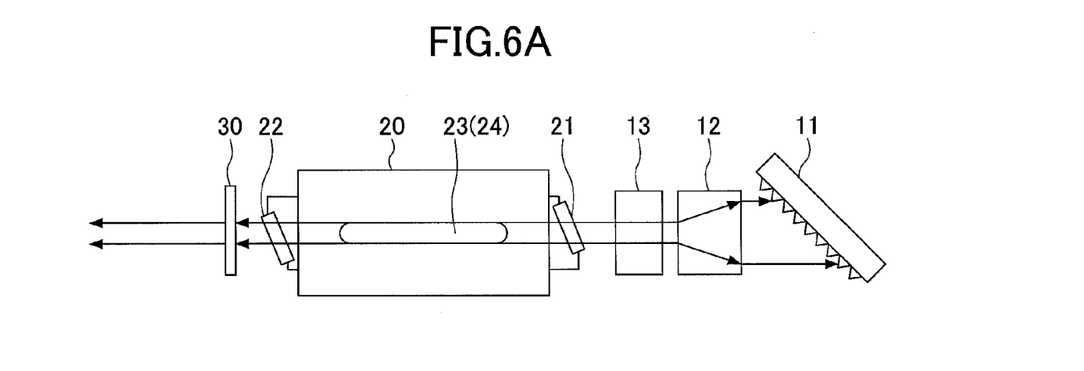
FIGS. 6A and 6B are explanation drawings of a part of an optical resonator of the laser apparatus of the present disclosure.
Figure 6B:
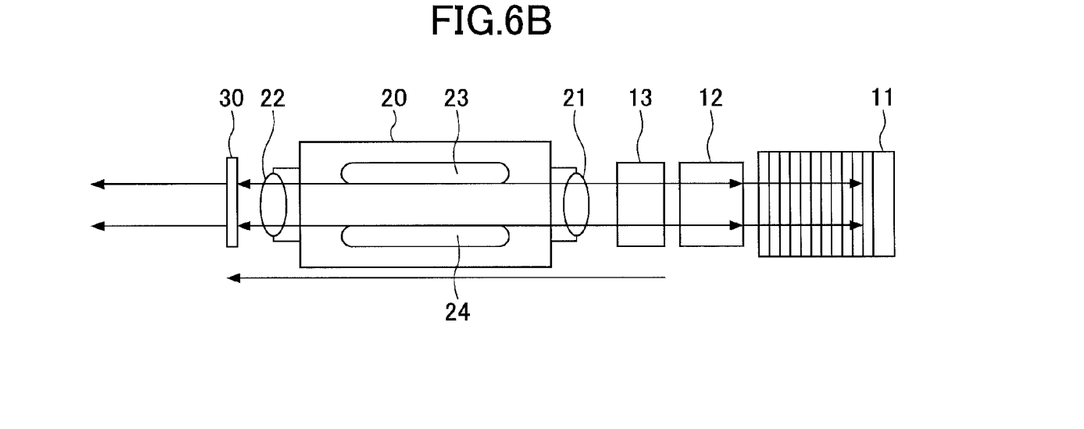

A description is given about an optical resonator portion of the spectral line width variable laser apparatus of the present disclosure based on FIGS. 6A and 6B. FIG. 6A is a top view showing the optical resonator portion of the spectral line width variable laser apparatus of the present disclosure, and FIG. 6B is a side view of the same portion.

In the spectral line width variable laser apparatus of the present disclosure, the spectral line width adjustment mechanism 12 and the optical loss adjustment mechanism 13 may be arranged between the grating 11 and the output coupler 30 that form the optical resonator. Furthermore, the spectral line width adjustment mechanism 12 and the optical loss adjustment mechanism 13 may be arranged between the grating 11 and the laser chamber 20. In addition, a beam expansion ratio adjustment mechanism that adjusts an expansion ratio M of the laser beam may be used as the spectral line width adjustment mechanism 12. Since the spectral line width Δλ is approximately inversely proportional to the expansion ratio M, the spectral line width adjustment mechanism 12 may be configured to be able to adjust the spectral line width of the laser beam output from the beam expansion ratio adjustment mechanism.

The optical loss adjustment mechanism 13 may be arranged between the grating 11 and the output coupler 30 that form the optical resonator. As the expansion ratio M is decreased, the laser beam is diffracted by the grating 11 and the energy of the laser beam returned to the optical resonator is increased. Accordingly, when the excitation intensity is the same, output of the laser beam may be increased. Therefore, the optical loss adjustment mechanism 13 may increase the optical loss so that the output of the laser beam is within the allowable range. Moreover, when the spectral line width of the output laser beam is required to be narrowed, the optical loss by the optical loss adjustment mechanism 13 may be decreased by allowing the spectral adjustment mechanism 12 to increase the expansion ratio M.

Figure 7:
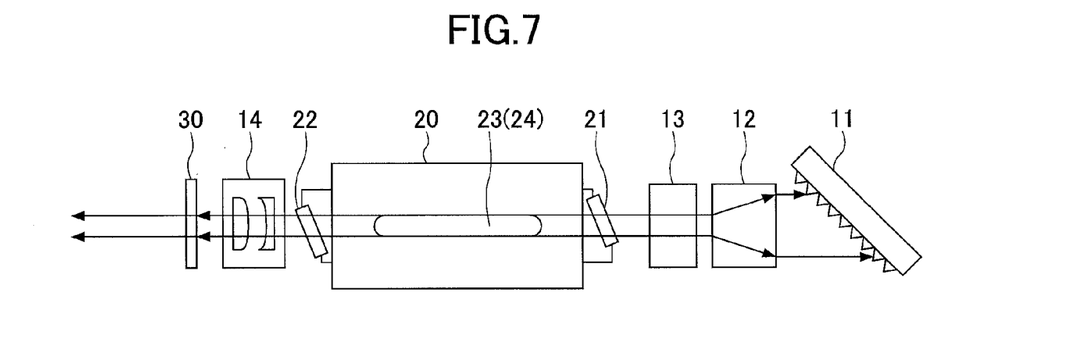
FIG. 7 is an explanation drawing of another part of the optical resonator of the laser apparatus of the present disclosure.

Furthermore, as shown in FIG. 7, the spectral line width variable laser apparatus of the present disclosure may further include a wave surface adjustment mechanism 14 between the grating 11 and the output coupler 30 that form the optical resonator. In the spectral line width variable apparatus, curvature of a wave surface of the laser beam incident on the grating 11 may be changed by allowing the wave surface adjustment mechanism 14 to adjust the wave surface of the laser beam in the optical resonator. As a result, the wave surface adjustment mechanism 14 may change a wavelength selection property in the grating 11. A combination of cylindrical lens and the like may be used as the wave surface adjustment mechanism 14.

In addition, the spectral line width variable apparatus may be configured to be able to broaden a variable range of the spectral line width by a combination of the wave surface adjustment mechanism 14 and changing the expansion ratio M of the spectral line width adjustment mechanism 12. The optical loss adjustment mechanism 13 may be arranged anywhere in the optical resonator. The loss of the optical loss adjustment mechanism 13 may be adjusted so that the energy of the laser beam output at the same excitation intensity are the approximately same.

Figure 8:
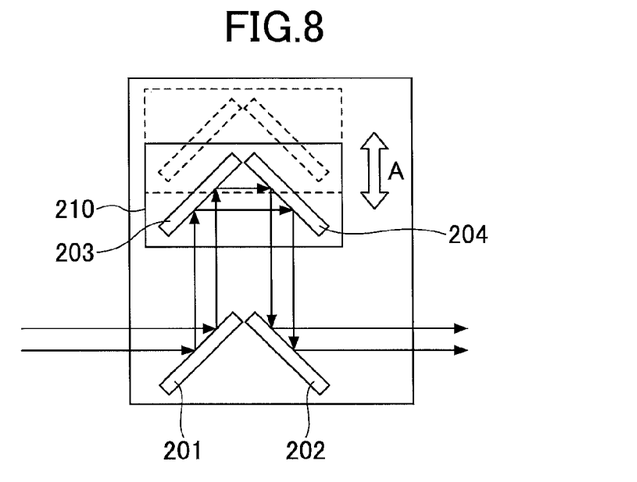
FIG. 8 is an explanation drawing of an optical path length adjustment mechanism being the optical loss adjustment mechanism.

4. Embodiment of Optical Loss Adjustment Mechanism 4.1 Optical Path Length Adjustment Mechanism Next, a description is given about an optical path length adjustment mechanism being the optical loss adjustment mechanism 13 based on FIG. 8. The optical path length adjustment mechanism includes a first high reflectivity mirror 201, a second high reflectivity mirror 202, a third high reflectivity mirror 203, and a fourth high reflectivity mirror 204. The third high reflectivity mirror 203 and the fourth high reflectivity mirror 204 may be placed on a linear stage 210. In the optical path length adjustment mechanism, the laser beam incident on the first high reflectivity mirror 201 may exit after being reflected by the first high reflectivity mirror 201, the third high reflectivity mirror 203, the fourth high reflectivity mirror 204, and the second high reflectivity mirror 202 in this order. In the optical path length adjustment mechanism, a distance between the first high reflectivity mirror 201 and the third high reflectivity mirror 203 and a distance between the second high reflectivity mirror 202 and the fourth high reflectivity mirror 204 may be adjusted by moving the linear stage 210 in a direction shown by an arrow A. In this manner, the optical path length adjustment mechanism may be configured to be able to adjust the optical path length of the laser beam by adjusting the distance between the first high reflectivity mirror 201 and the third high reflectivity mirror 203 and the distance between the second high reflectivity mirror 202 and the fourth high reflectivity mirror 204. The optical path length in the laser resonator is correlated with the optical loss, and therefore the output laser energy value is sometimes influenced by the optical path length in the laser resonator. Accordingly, in the optical path length adjustment mechanism in FIG. 8, the optical loss may be adjusted by adjusting the optical path length as just described.

4.2 Transmittance Adjustment Mechanism

Figure 9:
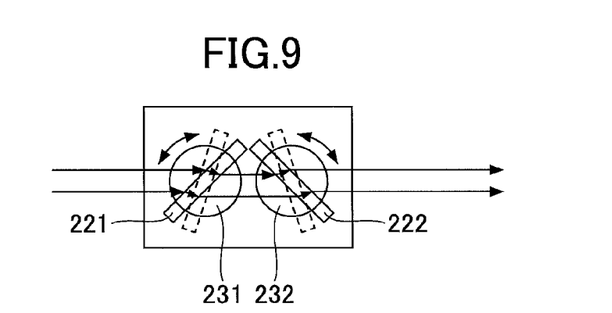
FIG. 9 is an explanation drawing of a transmittance adjustment mechanism being the optical loss adjustment mechanism.

Next, a description is given about a transmittance adjustment mechanism being the optical loss adjustment mechanism 13 based on FIG. 9. The transmittance adjustment mechanism may include a plate-like first partially transmissive element 221, a plate-like second partially transmissive element 222, a first rotation stage 231 configured to rotate the first partially transmissive element 221, and a second rotation stage 232 configured to rotate the second partially transmissive element 222. Each of the first rotation stage 231 and the second rotation stage 232 turns about a virtual axis approximately perpendicular to a light entrance surface of each of the first partially transmissive element 221 and the second partially transmissive element 222. The first partially transmissive element 221 and the second partially transmissive element 222 may be configured to transmit a part of the incident light.

The transmittance adjustment mechanism may be configured to be able to adjust the transmittance of the light transmitting the first partially transmissive element 221 and the second partially transmissive element 222 by rotating the first rotation stage 231 and the second rotation stage 232. The first partially transmissive element 221 and the second partially transmissive element 222 may be formed by coating a multi-layer film on a substrate that transmits the laser beam. In this way, the transmittance adjustment mechanism may be configured to be able to change the transmittance by rotating the first rotation stage 231 and the second rotation state 232, thereby changing the incidence angle of the laser beam. In addition, rotation angles of the first rotation stage 231 and the second rotation stage 232 may be controlled so that the incidence angles of the laser beam incident on the first partially transmissive element 221 and the second partially transmissive element 222 become the same.

4.3 Slit Width Adjustment Mechanism

Figure 10:
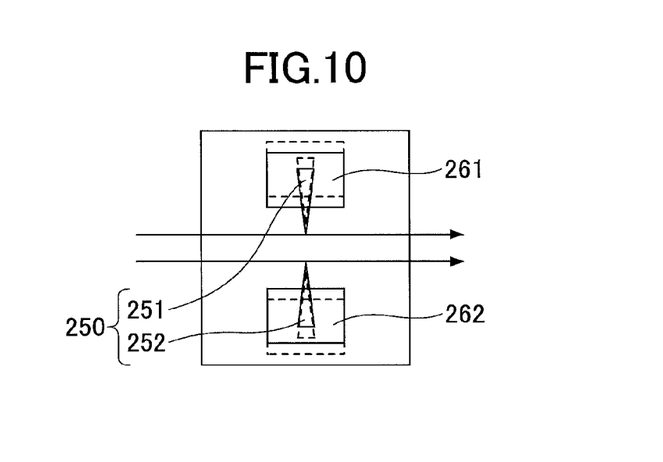
FIG. 10 is an explanation drawing of a slit width adjustment mechanism being the optical loss adjustment mechanism.

Next, a description is given about a slit width adjustment mechanism being the optical loss adjustment mechanism 13 based on FIG. 10. The slit width adjustment mechanism may include a first slit member 251, a second slit member 252, a first linear stage 261 configured to move the first slit member 251, and a second linear stage 262 configured to move the second slit member 252. Here, the slit 250 may be formed of the first slit member 251 and the second slit member 252. The slit width adjustment mechanism may be configured to be able to adjust a slit width by allowing the first linear stage 261 and the second linear stage 262 to narrow or broaden a distance between the first slit member 251 and the second slit member 252. Moreover, the slit width adjustment mechanism may be installed in the optical resonator of the laser apparatus 10, for example, between the output coupler 30 and the laser chamber 20, between the laser chamber 20 and the spectral line width adjustment mechanism 12, or the like.

5. Wave Surface Adjustment Mechanism

Figure 11A:
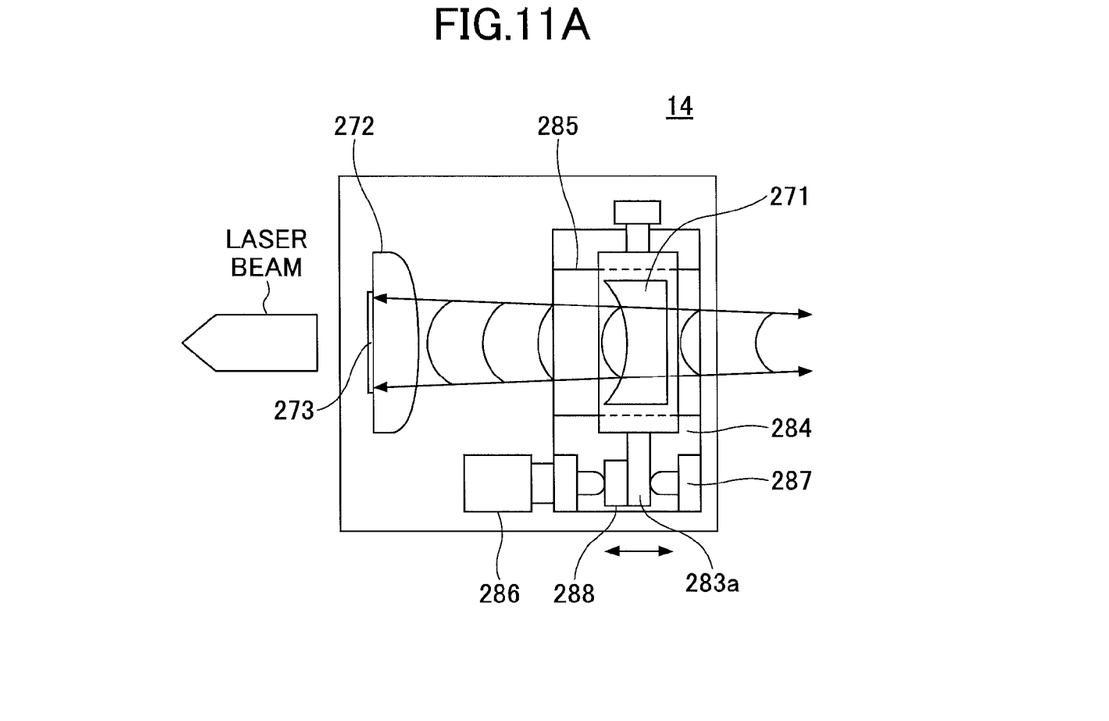
FIGS. 11A and 11B are explanation drawings of a wave surface adjustment mechanism of an optical loss adjustment mechanism.
Figure 11B:
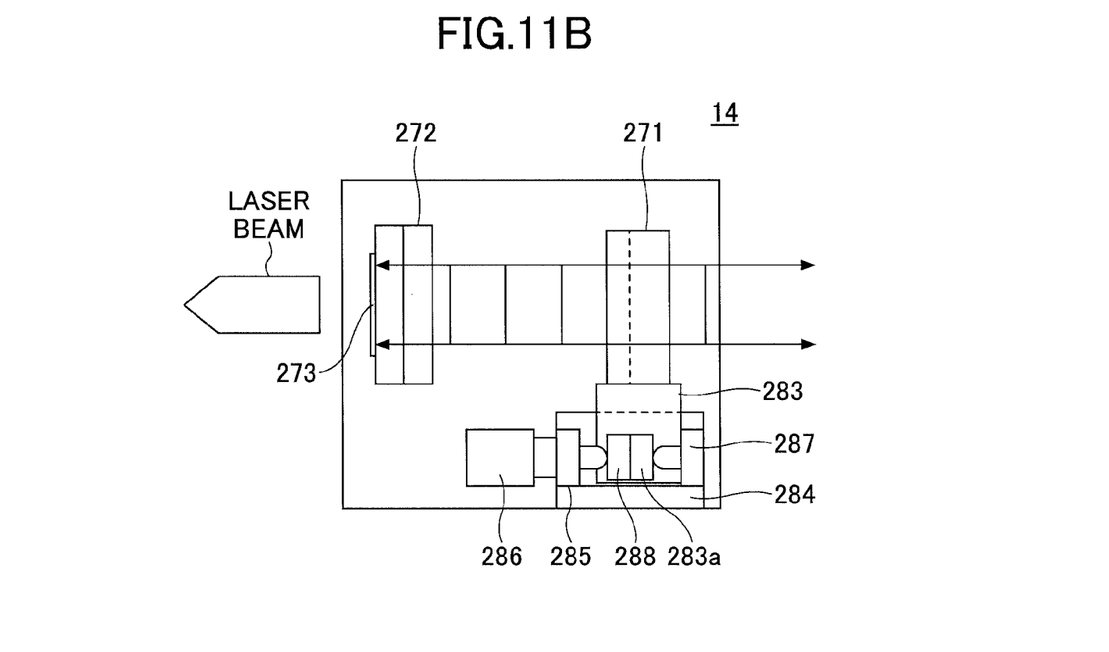

Next, a description is given about the wave surface adjustment mechanism 14 based on FIGS. 11A and 11B. FIG. 11A is a top view of the wave surface adjustment mechanism 14, and FIG. 11B is a side view of the wave surface adjustment mechanism 14. The wave surface adjustment mechanism 14 shown in FIGS. 11A and 11B may include a plano-concave cylindrical lens 271 and a plano-convex cylindrical lens 272. The plano-concave cylindrical lens 271 and the plano-convex cylindrical lens 272 may be arranged so that the center axes thereof are located on the optical path in the laser resonator and mechanical axes thereof are approximately perpendicular to a wavelength dispersion surface of the grating 11. As shown in FIGS. 11A and 11B, a partially reflective film 273 configured to reflect a part of the laser beam may be formed on a plane side of the plano-convex cylindrical lens 272. This makes it possible not to require the output coupler 30 shown in FIG. 7. In the meantime, the partially reflective film 273 may not be formed on the plane side of the plano-convex cylindrical lens 272. When this structure is adopted, the output coupler 30 shown in FIG. 7 may be used. As shown in FIG. 11B, the plano-concave cylindrical lens 271 may be fixed on the top surface of a moving plate 283. The moving plate 283 may be movable in a direction of an arrow shown in FIG. 11A along a linear guide 285 formed in a one-axis stage 284. The one-axis stage 284 may be arranged so that an extending direction of the linear guide 285 is parallel to the optical axis.

A convex portion 283a convexly protruding is formed on a side surface of the moving plate 283. One end of a PZT (piezoelectric) element 288 may contact the front surface of the convex portion 283a, and a head of a protrusion portion 287 may contact the back surface of the convex portion 283a. A head of a pulse motor 286 may contact the other end of the PZT element 288. The pulse motor 286 and the PZT element 288 may be extensible in the extending direction of the linear guide 285, the extension of which may generate a force applied to the convex portion 283a in a direction toward protrusion portion 287. A spring extensible in the extending direction of the linear guide 285 is connected to the head of the protrusion portion 287, and the spring may apply a force to the convex portion 283a in a direction toward the pulse motor 286 and the PZT element 288. Accordingly, the pulse motor 286 and the PZT element 288 may expand and contract by input of an operation signal according to an instruction value transmitted from the control unit 40 and the like, by which the moving plate 283 may be moved along the linear guide 285.

A surface on a side close to the laser chamber 20 of the plano-convex cylindrical lens 272 may be coated with an antireflection (AR) film, and an exit surface (i.e., a surface on a side away from the laser chamber 20) may be coated with a partially reflective (PR) film. Both sides of the plano-convex cylindrical lens 271 may be covered with the antireflection (AR) film.

6. Spectral Line Width Adjustment Mechanism

Figure 12:
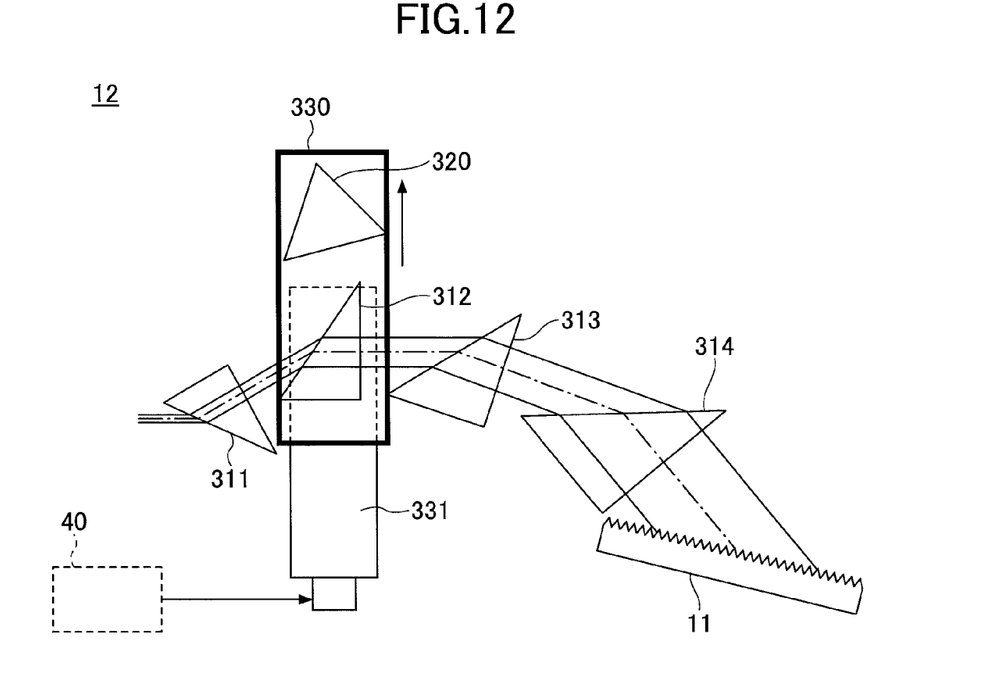
FIG. 12 is a first explanation drawing of the spectral line width adjustment mechanism.
Figure 13:
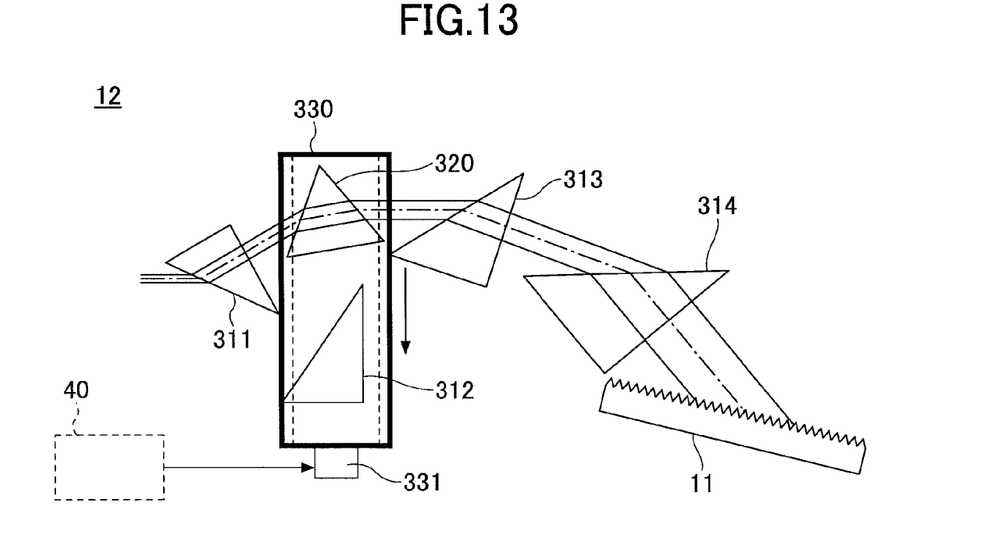
FIG. 13 is a second explanation drawing of the spectral line width adjustment mechanism.

Next, a description is given about the spectral line width adjustment mechanism 12 based on FIGS. 12 and 13. FIG. 12 shows a case of performing the lithography in a normal mode, and FIG. 13 shows a case of performing the lithography in an FD mode. The spectral line width adjustment mechanism 12 may include a first beam expansion prism 311, a second beam expansion prism 312, a third beam expansion prism 313, a fourth beam expansion prism 314, and further a dispersion prism 320. The second beam expansion prism 312 and the dispersion prism 320 may be installed on a moving plate 330. The spectral line width adjustment mechanism 12 may be configured to be able to move the second beam expansion prism 312 or the dispersion prism 320 to a desired position in the optical path of the laser beam by driving a linear stage 331 in a direction of an arrow in FIG. 12 by being controlled by the control unit 40.

Figure 14:
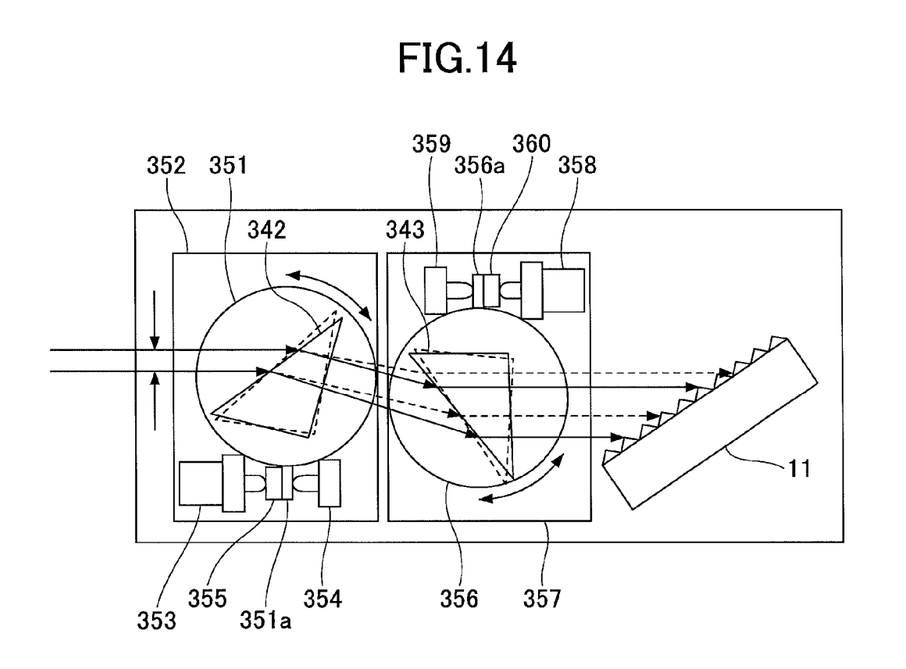
FIG. 14 is a third explanation drawing of the spectral line width adjustment mechanism.

Moreover, the spectral line width adjustment mechanism 12 may be a beam expansion ratio adjustment mechanism having a structure shown in FIG. 14. The spectral line width adjustment mechanism 12 may be configured to be able to adjust the spectral width by changing a rotation angle of a prism to adjust an expansion ratio of a beam incident on the grating 11, by which an expansion of the beam incident on the grating 11 is adjusted.

In the spectral line width adjustment mechanism 12, a first prism 342 may be fixed to a first rotation plate 351, and the first rotation plate 351 may be supported via an axis by a first rotation stage 352. A convex portion 351a convexly protruding is formed on a side surface of the first rotation plate 351. An end of a PZT element 355 may contact a front surface of the convex portion 351a, and a head of a protrusion portion 354 may contact a back surface of the convex portion 351a. A head of a pulse motor 353 may contact the other end of the PZT element 355. The pulse motor 353 or the PZT element 355 may be configured to apply a force to the convex portion 351a in a direction toward the protrusion portion 354 by extension. Otherwise, an extensible spring may be connected to a head of the protrusion portion 354, and the spring may apply a force to the convex portion 351a in a direction toward the pulse motor 353 and the PZT element 355. Accordingly, the first rotation plate 351 may be rotated by expansion and contraction of the pulse motor 353 or the PZT element 355.

A second prism 343 is fixed to a second rotation plate 356, and the structure of the second prism 343 may be similar to the structure of the first prism 342 fixed to the first rotation plate 351. More specifically, the second rotation plate 356 may be supported by a second rotation stage 357 via an axis. A convex portion 356a convexly protruding may be formed on a side surface of the second rotation plate 356. An end of a PZT element 360 may contact a front surface of the convex portion 356a, and a head of a protrusion portion 359 may contact a back surface of the convex portion 356a. A head of a pulse motor 358 may contact the other end of the PZT element 360. The pulse motor 358 or the PZT element 360 may be configured to apply a force to the convex portion 356a in a direction toward the protrusion portion 359 by extension. Otherwise, an extensible spring may be connected to a head of the protrusion portion 359, and the spring may apply a force to the convex portion 356a in a direction toward the pulse motor 358 and the PZT element 360. Accordingly, the second rotation plate 356 may be rotated by expansion and contraction of the pulse motor 358 or the PZT element 360.

When the spectral line width is adjusted, the first rotation plate 351 and the first prism 342 may be rotated by adjusting the pulse motor 353 or the PZT element 355 while preventing the oscillation wavelength of the laser from being changed. Similarly, the second rotation plate 356 and the second prism 343 may be rotated by adjusting the pulse motor 358 or the PZT element 360 to adjust the spectral line width. In this case, the first rotation plate 351 and the first prism 342 may be rotated in a direction opposite to a rotation direction of the second rotation plate 356 and the second prism 343, and respective rotation angles may be the same. This causes the beam expansion ratio by the first prism 342 and the second prism 343 to change. The spectral line width adjustment mechanism 13 may be configured to broaden the spectral width as the expansion ratio is decreased, and to narrow the spectral width as the expansion ratio is increased.

When the expansion ratio is changed, two prisms of the first prism 342 and the second prism 343 are preferably rotated at the same time so as not to change a direction of an optical path axis of the laser beam, by which the expansion ratio is adjusted.

Figure 15:
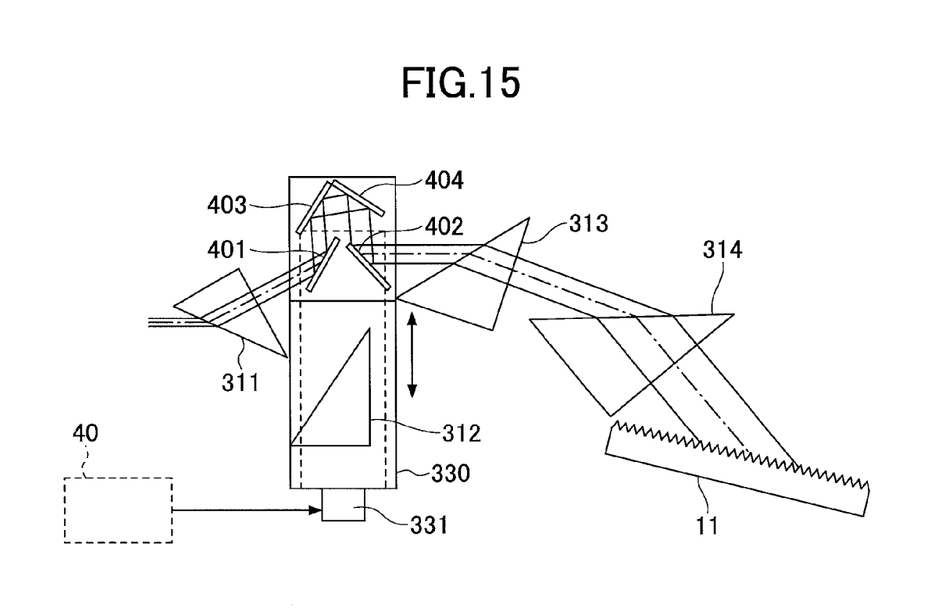
FIG. 15 is a first explanation drawing of a combination of the spectral line width adjustment mechanism and the optical loss adjustment mechanism.

7. Combination of Spectral Line Width Adjustment Mechanism and Optical Loss Adjustment Mechanism 7.1 Combination with Optical Path Length Adjustment Mechanism The spectral line width variable laser apparatus of the present disclosure may include a combination structure of the spectral line width adjustment mechanism 12 and the optical path length adjustment mechanism to be the optical loss adjustment mechanism 13. In other words, as shown in FIG. 15, the spectral line width variable laser apparatus may include the combination of the spectral line width adjustment mechanism 12 shown in FIGS. 12 and 13 and the optical path length adjustment mechanism to be the optical loss adjustment mechanism 13 shown in FIG. 8. More specifically, the optical path length adjustment mechanism to be the optical loss adjustment mechanism 13 shown in FIG. 8 may be provided, instead of the dispersion prism 320 in the spectral line width adjustment mechanism 12 shown in FIGS. 12 and 13.

In this structure, a first high reflectivity mirror 401, a second high reflectivity mirror 402, a third high reflectivity mirror 403, and a fourth high reflectivity mirror 404 may be arranged on the moving plate 330. In this structure, by driving a linear stage 331, the expansion ratio may be changed, and the optical path length may be also changed while suppressing the change of the optical path of the laser beam incident on the prisms 311, 313. In this structure, the light incident on the first reflectivity mirror 401 may exit after being reflected by the first high reflectivity mirror 401, the third high reflectivity mirror 403, the fourth high reflectivity mirror 404, and the second high reflectivity mirror 402 in this order. Here, FIG. 15 shows a case of the FD mode.

Figure 16:
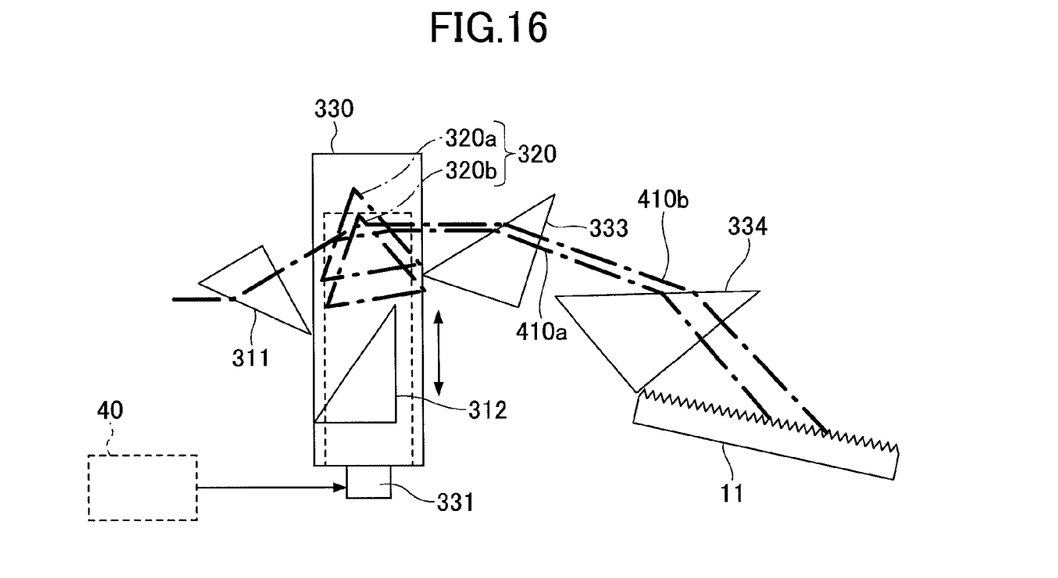
FIG. 16 is an explanation drawing of the spectral line width adjustment mechanism which has a function of the optical loss adjustment mechanism.

Moreover, as shown in FIG. 16, in the spectral line width adjustment mechanism 12 shown in FIGS. 12 and 13, a position of the dispersion prism 320 may be finely adjusted. In FIG. 16, installation positions of the dispersion prism 320 are shown as a position 320a and a position 320b shown by alternate long and short dash lines. More specifically, the linear stage 331 may be able to finely adjust the installation position 320 in a direction of an arrow in FIG. 16 by control from the control unit 40. For example, a linear stage with a pulse motor and the like may be used as such a unit that can adjust the installation position finely. When the spectral width of the output laser beam is broaden, the optical path length of the optical resonator may be adjusted by finely adjusting the position of the dispersion prism 320 to suppress the increase of the laser output energy. More specifically, the installation position of the dispersion prism 320 may be moved from the position 320a to the position 320b. In this case, the center axis of the optical path when the dispersion prism 320 is placed at the position 320a becomes an optical path 410a shown by an alternate long and short dash line. In contrast, the center axis of the optical path when the dispersion prism 320 is moved and placed at the position 320b is an optical path 410b shown by an alternate long and short dash line. In this manner, the optical path length in the optical path 410b shown by the alternative long and short dash line can be longer than the optical path length in the optical path 410a shown by the alternative long and short dash line. In this way, the spectral line width adjustment mechanism 12 may be configured to be able to continuously adjust the optical path length of the laser beam in an effective range of the dispersion prism 320.

7.2 Combination with Transmittance Adjustment Mechanism

Figure 17:
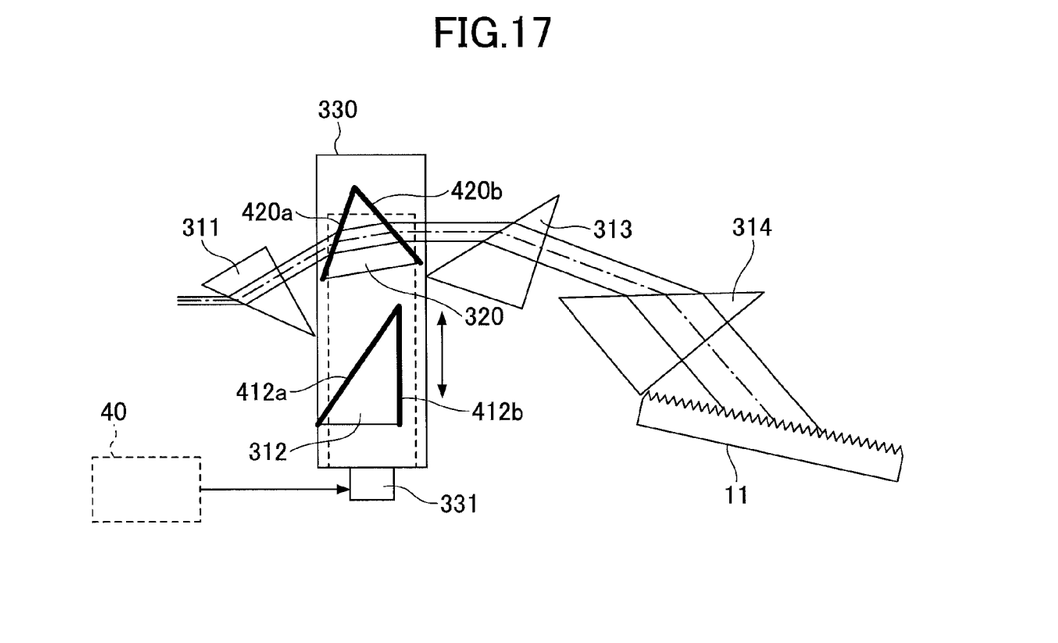
FIG. 17 is a second explanation drawing of a combination of the spectral line width adjustment mechanism and the optical loss adjustment mechanism.

The spectral line width variable laser apparatus of the present disclosure may include a combination structure of the spectral line width adjustment mechanism 12, and the transmittance adjustment mechanism to be the optical loss adjustment mechanism 13. In other words, as shown in FIG. 17, in the spectral line width adjustment mechanism shown in FIGS. 12 and 13, a partially reflective film may be formed on a laser beam entrance surface of the dispersion prism 320, and an antireflection film may be formed on a laser beam entrance surface of the second beam width expansion prism 312. More specifically, partially reflective films 420a, 420b may be formed on the laser beam entrance surface of the dispersion prism 320, and antireflection films 412a, 412b may be formed on the laser beam entrance surface of the second beam width expansion prism 312. Otherwise in general, an antireflection film is sometimes formed on a laser beam entrance surface of the dispersion prism 320. However, since a similar wavelength dispersion effect may be obtained even if the antireflection film is not formed, a structure without forming the antireflection film may be adopted.

Figure 18:
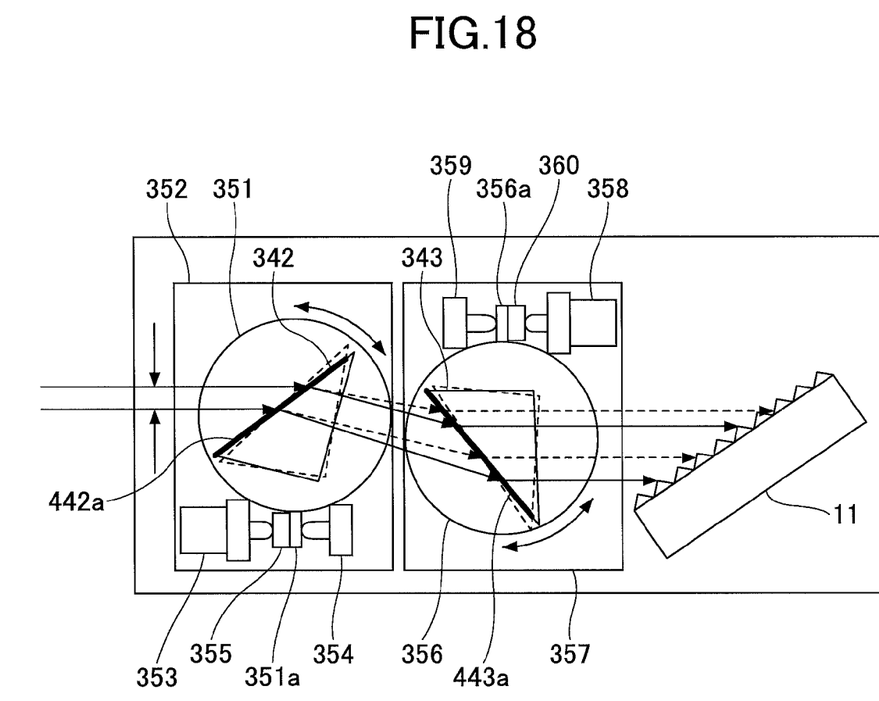
FIG. 18 is a third explanation drawing of a combination of the spectral line width adjustment mechanism and the optical loss adjustment mechanism.

Furthermore, as shown in FIG. 18, in the spectral line width adjustment mechanism shown in FIG. 14, films 442a and 443a configured to change transmittance thereof depending on incidence angles of the laser beam may be provided on laser beam entrance surfaces of the prisms 342 and 343. Such films 442a and 443a may increase the transmittance of the laser beam when the laser beam incidence angle is large and the expansion ratio is large, and may decrease the transmittance of the laser beam when the laser beam incidence angle is small and the expansion ratio is small.

8. Spectral Line Width Variable Laser Apparatus Including Amplifier

The spectral line width variable laser apparatus may be used as a master oscillator (MO). A seed laser beam output from the master oscillator may be amplified by an amplifier not shown in the drawings. The amplifier may be a chamber configured to contain an excimer laser gas therein and to discharge at the timing when the seed laser beam passes therethrough. The amplifier may be a power oscillator (PO). An optical resonator of the power oscillator may be a Fabry-Perot-type or a ring-type optical resonator.

The above described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more".

What is claimed is:

1. A laser apparatus comprising:
   an optical resonator including a mirror configured to reflect a part of light and a grating;
   a laser chamber configured to emit a laser beam by a power source and a laser gain medium provided in the optical resonator;
   an optical loss adjustment mechanism provided in the optical resonator and configured to adjust an optical loss of the laser beam; and
   a spectral line width adjustment mechanism provided in the optical resonator and configured to adjust a spectral line width of the laser beam,
   wherein the optical loss adjustment mechanism and the spectral line width adjustment mechanism form an integrated mechanism including a beam width expansion prism and a dispersion prism,
   wherein a partially reflective film is formed on an entrance surface of the dispersion prism where the laser beam enters, and
   wherein the integrated mechanism is configured to switch a first state in which the beam width expansion prism is placed on an optical path of the laser beam and a second state in which the dispersion prism is placed on the optical path of the laser beam so as to adjust the spectral line width of the laser beam.

* * * * *